United States Patent [19]
Oswald et al.

[11] 3,813,922
[45] June 4, 1974

[54] AIR LEAK DETECTOR

[75] Inventors: Thomas L. Oswald, St. Paul; Alby H. Wolf, Minneapolis, both of Minn.

[73] Assignee: Gould, Inc., Mendota Heights, Minn.

[22] Filed: Mar. 15, 1972

[21] Appl. No.: 234,826

[52] U.S. Cl. .............................................. 73/49.2
[51] Int. Cl. ............................................ G01m 3/32
[58] Field of Search .......... 73/49.2, 49.3, 37.9, 209

[56] References Cited
UNITED STATES PATENTS

| | | | |
|---|---|---|---|
| 3,028,750 | 4/1962 | Rondeau | 73/40 X |
| 3,529,463 | 9/1970 | Orlando et al. | 73/49.2 |
| 3,691,821 | 9/1972 | Davey | 73/49.2 |

OTHER PUBLICATIONS

Publ. "Leakage Measuring Method", NASA Tech. Brief No. 69-10438, (2 pp.), Sept. 1969.

Primary Examiner—Richard C. Queisser
Assistant Examiner—Daniel M. Yasich
Attorney, Agent, or Firm—Wolfe, Hubbard, Leydig, Voit & Osann, Ltd.

[57] ABSTRACT

A leak detector in which a regulated pressure air source is coupled to a container under test through both an open-close valve and a flow meter having an element moved by slight air flow. A detector, of the photoelectric type, is positioned to respond to movement of the flow meter element back to zero. The valve is opened until the container is charged to test pressure with any further flow being the result of a leak, then the valve is closed and the detector activated so that it will respond to movement of the element back to zero if it had been displaced by flow due to a leak. A second charging valve bypasses the flow meter to permit rapid container charging and a short test cycle.

3 Claims, 2 Drawing Figures

PATENTED JUN 4 1974 3,813,922

AIR LEAK DETECTOR

This invention relates to devices for testing the integrity of container seals and, more particularly, concerns checking containers for air leaks.

One of the final steps in manufacturing many kinds of articles is sealing a container that constitutes the outer wrapper for the article. When a failure of the seal's integrity, i.e., a possible leak in or out, is important to the future use of the article, some means of testing the container for possible leaks is normally a part of the manufacturing process.

In the case of secondary storage batteries using liquid electrolyte, leakage is particularly undesirable. Present-day batteries often utilize plastic containers which are heat sealed along lines separating the individual cells and enclosing all of the cells. Such batteries are normally assembled on high speed production lines, and their heat seals should be checked against leakage not only rapidly and reliably, but with considerable sensitivity since even "micro leaks", those on the order of less than 1.0 SCFH (Standard Cubic Feet of Air per Hour), are undesirable in the final product.

Heretofore, apparatus suitable for detecting very small leakage rates has been expensive and not well suited for production line use, whereas more rugged production line devices do not have the required sensitivity to reliably detect micro leaks.

Accordingly, it is the primary aim of the invention to provide a leak detector assembly that is precise and highly sensitive to even miro leaks, but is low in initial cost and is easily and economically maintained. A related object of the invention is to provide an assembly of the foregoing type that utilizes air to sense possible leaks and which is made up of readily available air handling components.

A further object is to provide an assembly as characterized above that is quite rapid acting while retaining the ability to sense and respond to air leakage rates down to about 0.1 SCFH.

Other objects and advantages of the invention will become apparent upon reading the following detailed description and upon reference to the drawings, in which.

Figure 1:
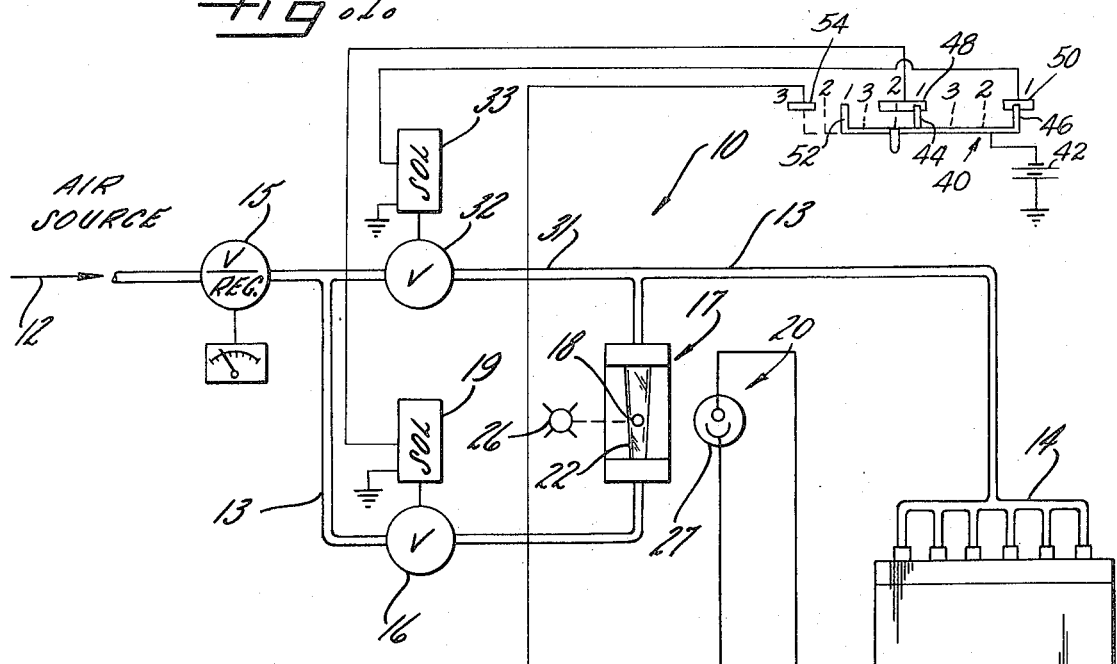
FIG. 1 is a schematic showing of an assembly embodying the invention.
Figure 2:
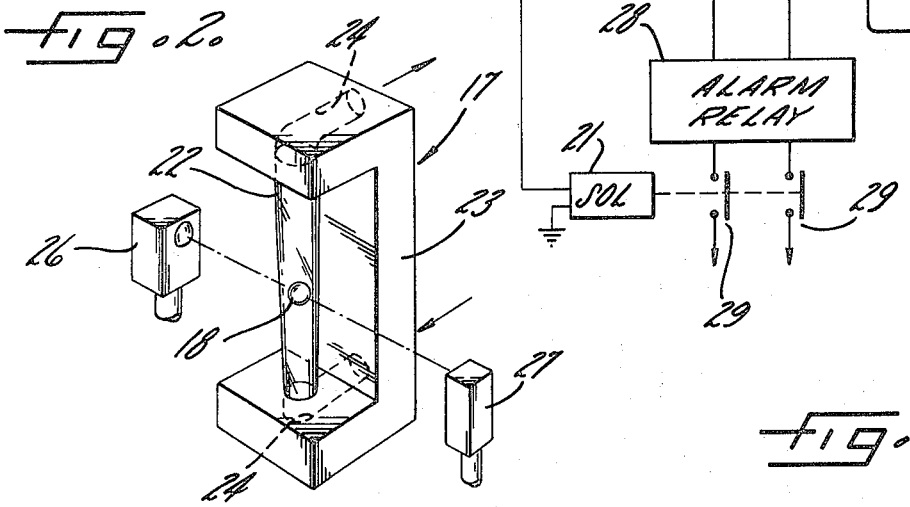
FIG. 2 is a fragmentary perspective of a portion of the assembly appearing in FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning to the drawing, there is shown an assembly 10 embodying the invention arranged to detect leaks in a battery container 11. A source 12 of air under pressure is connected through a line 13 to a manifold 14 opening the line 13 to the cells of the container 11. A pressure regulating valve 15 stabilizes the supply of air to the system and, in the illustrated application, a test pressure in the container of about 2 psi gives satisfactory results and is established by the regulating valve 15.

In carrying out the invention, an open-close valve 16 and a flow meter 17 with an element 18 which moves from a zero position in response to air flow are interposed in the line 13, a normally disabled detector 20 is positioned to respond to the presence of the element 18 away from its zero position, and operating solenoids 19 and 21 are provided to, respectively, operate the valve 16 and able the detector 20. By energizing the solenoid 19 to open the valve 16 until a point in time after the container 11 is fully charged to test pressure, further flow through the meter 17 will then be solely to replace air leaking from the container. If there is no leak, the element 18 will remain at zero flow position once the container is charged. The solenoids 19, 21 are then both operated to close the valve 16 and able the detector 20. If there has been no leak, the detector will "see" nothing. If there has been a leak, the element 18 will have been displaced but, when the valve 16 is closed, will return to its zero flow position and the detector 20 will respond, and, because it is then abled, produce an appropriate signal.

Preferably, the flow meter 17 is of the type in which the element 18 is a ball fitted in an inverted hollow frustum 22 through which the flow detected is from the bottom to the top. If there is no flow, the ball 18 rests at the lower end of the frustum 22. Air flow moves the ball 18 up the frustum 22 a distance proportional to the flow rate, since the clearance between the inner wall of the frustum and the ball increases as the ball moves upwardly carried by the air stream against the force of gravity. By utilizing appropriate ball weights and sizes, very low flow rates can be sensed. The illustrated meter 17 is of a commercially available form in which the frustum 22 is glass mounted in a U-shaped block 23 formed with passages 24 that are readily connected in the line 13.

The detector 20 in the illustrated assembly 10 is of the photoelectric type including a lamp 26 and a photosensitive cell 27 coupled to a relay 28. The relay 28 responds when the circuit through the cell 27 is interrupted, and the cell and the lamp 26 are positioned so that the ball 18 of the meter 17 intercepts light from the lamp to the cell and thus interrupts cell current flow so as to trip the relay 28. Normally open contacts 29 disable the output of the relay 28 but, when the contacts are closed by the solenoid 21, the relay signal is available for tripping a suitable alarm or automatic rejection device.

As a feature of the invention, a second line 31 connects the air source 12 with the container 11 bypassing the valve 16 and the meter 17, and a charging valve 32 operated by a solenoid 33 is interposed in the line 31. Since the meter 17 is intended to detect very low flow rates, it inherently acts as a flow restrictor. However, opening the valve 32 permits very rapid charging of the container 11 to the test pressure through the line 31 which bypasses the meter 17.

Figure 3:
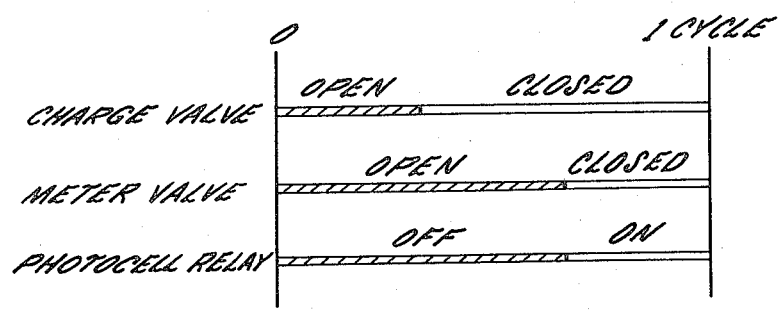
FIG. 3 is a timing chart pertaining to operation of the assembly shown in FIG. 1.

The operating sequence for a given test cycle, graphically shown in FIG. 3, consists of first operating the solenoids 19, 33 to open both valves 16, 32. The valve 32 is closed after the short time interval required to directly charge the container 11 through the line 31 to the test pressure; about 2 psi. The valve 16 remains open for a further short time interval and, if there is a leak, there will be further air flow to the container through the meter 17. The meter 17 is selected, and the detector 20 positioned, to put the element 18 in detecting position at the desired threshold limit for permissible leakage in an acceptable container and, in the assembly 10, a threshold flow rate of 0.2 SCFH is quite workable. The valve 16 is then closed and the solenoid 21 actuated to able the detector relay 28. If there has been leakage at the threshold rate or higher, the element 18 will be detected as it passes between the lamp 26 and the cell 27 toward the zero position and any desired alarm circuit or automatic rejection device will thereby be tripped by the relay 28 through the then closed contacts 29.

Those familiar with this art will appreciate that the assembly 10 consists of readily available elements which can be properly associated at a low initial cost. The assembly is quite precise and highly sensitive to even micro leaks, and virtually the only maintenance required is periodic replacement of the lamp 26. It will be readily apparent that appropriate timing of the components through an operating cycle can be accomplished manually, through a very simple timed switching circuit, or as a simple addition to a more elaborate automatic assemblying controller.

We claim as our invention:

1. An air leak detecting assembly comprising, in combination, a line for coupling a source of air under test for leakage, a pressure regulator in said line for supplying a controlled air pressure from said source, a first open-close valve means in said line for charging the container to said controlled air pressure, a by-pass line connected across said first valve means, an air flow meter in said by-pass line, a second open-close valve means in said by-pass line for connecting said source of air to the container via said air flow meter, said air flow meter having an element which moves from a zero position in response to air flow, a normally disabled detector responsive to the presence of said element at a distance from said zero position, and means selectively interconnecting said first and second valve means and said detector means (1) for closing said first valve means after (a) a first time interval during which the container is charged and (b) for closing said second valve means after a subsequent time interval during which further air flow occurs solely as the result of a leak and (2) for abling said detector after said subsequent time interval for responding to said element.

2. The combination of claim 1 in which said flow meter includes an inverted hollow frustum and said element is a ball within said frustum which is moved up a distance proportional to the air flow rate through the meter to the container.

3. The combination of claim 2 in which said frustum is transparent and said detector includes a lamp and photocell for detecting movement of said ball back to zero position if it has been moved up by air flow while said open-close valve was open.

* * * * *

PO-1050
(5/69)

UNITED STATES PATENT OFFICE
CERTIFICATE OF CORRECTION

Patent No. 3,813,922          Dated June 4, 1974

Inventor(s) Thomas L. Oswald and Alby H. Wolf

It is certified that error appears in the above-identified patent and that said Letters Patent are hereby corrected as shown below:

In claim 1, column 3, line 25, the words -- under pressure to a container -- should be inserted after the word "air".

Signed and sealed this 4th day of February 1975.

(SEAL)
Attest:

McCOY M. GIBSON JR.
Attesting Officer

C. MARSHALL DANN
Commissioner of Patents